US006988433B2

(12) United States Patent
LeClair

(10) Patent No.: US 6,988,433 B2
(45) Date of Patent: Jan. 24, 2006

(54) POWER-OPERATED TOOL HOLDER

(75) Inventor: Claude J. LeClair, Manitowoc, WI (US)

(73) Assignee: LeTroLaq Tooling and Assembly LLC, Manitowoc, WI (US)

( * ) Notice: Subject to any disclaimer, the term of this patent is extended or adjusted under 35 U.S.C. 154(b) by 52 days.

(21) Appl. No.: 10/663,865

(22) Filed: Sep. 16, 2003

(65) Prior Publication Data

US 2004/0089120 A1 May 13, 2004

Related U.S. Application Data

(60) Provisional application No. 60/411,298, filed on Sep. 17, 2002.

(51) Int. Cl.
*B25H 3/00* (2006.01)

(52) U.S. Cl. ............................ 81/487; 81/301; 269/96; 254/10.5

(58) Field of Classification Search .................. 81/301, 81/487; 269/96, 97; 254/10.5
See application file for complete search history.

(56) References Cited

U.S. PATENT DOCUMENTS

| | | | | |
|---|---|---|---|---|
| 2,692,384 | A * | 10/1954 | Wilson | 81/301 |
| 3,741,562 | A | 6/1973 | Resch | |
| 3,888,003 | A | 6/1975 | Brown | |
| 4,105,188 | A | 8/1978 | Mendoza et al. | |
| 4,363,476 | A | 12/1982 | Whittle | |
| 4,442,581 | A | 4/1984 | Molnick | |
| 6,173,629 | B1 | 1/2001 | Glaser | |

OTHER PUBLICATIONS

Techni-Tool Catalog 44, 2 pages, 1993.
Simonds Ergonomic Air-Powered Production Tools Catalog, 3 pages.
Handworker Product Brochure, 5 pages.

* cited by examiner

*Primary Examiner*—Hadi Shakeri
(74) *Attorney, Agent, or Firm*—Michael Best & Friedrich LLP

(57) ABSTRACT

A power-operated tool holder adapted to mount a hand tool for actuation thereof. In some embodiments, the tool holder includes a frame having a support adapted to receive a pivot pin, and an actuator coupled to the frame and releasably coupled to the hand tool in a mounted position of the hand tool with respect to the frame. The actuator is movable to actuate at least part of the hand tool about the pivot pin in the mounted position of the hand tool.

23 Claims, 4 Drawing Sheets

POWER-OPERATED TOOL HOLDER

This application claims benefit of Provisional Application No. 60/411,298, filed Sep. 17, 2002.

BACKGROUND OF THE INVENTION

In some light manufacturing operations, workers are required to perform repetitive tasks using tools of various types. In some cases, when considered individually, such tasks are not particularly difficult to perform. However, experience has proved that over time, workers can be injured by performing these tasks repetitively. Such repetitive motion injuries can include carpal tunnel syndrome, a painful condition which can require surgery to correct. To avoid such injuries, specialized production units have been substituted for hand cutters, pliers and other conventional hand tools. Generally, these production units are of highly specialized design and are expensive. Moreover, without known exception, these units require the purchase and stocking of non-standard tool heads and other components, which are themselves very costly. While large manufacturing operations can justify the expense of these specialized production units, they are often too expensive for small manufacturing operations.

In light of the shortcomings of conventional powered hand tool devices and components, improved powered hand tool devices, components, and methods would be welcome in the art.

SUMMARY OF THE INVENTION

Some embodiments of the present invention provide a power-operated tool holder adapted to mount a hand tool via a pivot pin, wherein the tool holder comprises a frame having a support adapted to receive the pivot pin; and an actuator coupled to the frame and releasably coupled to the hand tool in a mounted position of the hand tool with respect to the frame, and wherein the actuator is movable to actuate at least part of the hand tool about the pivot pin in the mounted position of the hand tool.

In another aspect of the present invention a power-operated tool holder is adapted to actuate a hand tool having a first handle and a second handle, and comprises a frame adapted to support the hand tool in a mounted position of the hand tool in the frame, a first roller positioned to drivably engage the first handle of the hand tool when installed in the mounted position in the frame, a second roller positioned to drivably engage the second handle of the hand tool when installed in the mounted position in the frame, and an actuator coupled to the frame and to the first and second rollers, wherein the first and second rollers actuatable by the actuator to drive the first and second handles of the hand tool, respectively.

In some embodiments, a power-operated tool holder adapted to actuate a hand tool having a first handle and a second handle is provided, and comprises a frame to which the hand tool is removably mounted, an actuator coupled to the frame, a first arm drivably coupled to the actuator and movable by the actuator to actuate the first handle of the hand tool, and a second arm drivably coupled to the actuator and movable by the actuator to actuate the second handle of the hand tool, wherein the first and second arms are movable with respect to the hand tool to actuate the hand tool.

In yet another aspect of the present invention, a power-operated tool holder adapted to actuate a hand tool is provided, and comprises a frame having a tool support by which the hand tool is releasably mounted to the frame, wherein the tool support has a first mounting location and a second mounting location different than the first mounting location to which a common portion of the hand tool is releasably mounted in different mounting configurations of the hand tool, and wherein the hand tool mounted in different positions with respect to the frame in the different mounting configurations, and an actuator coupled to the frame, wherein the hand tool is driven responsive to actuation of the actuator.

Other features and aspects of the present invention will become apparent to those skilled in the art upon review of the following detailed description, claims and drawings.

BRIEF DESCRIPTION OF THE DRAWINGS

In the drawings, wherein like reference numerals indicate like parts.

Figure 1:
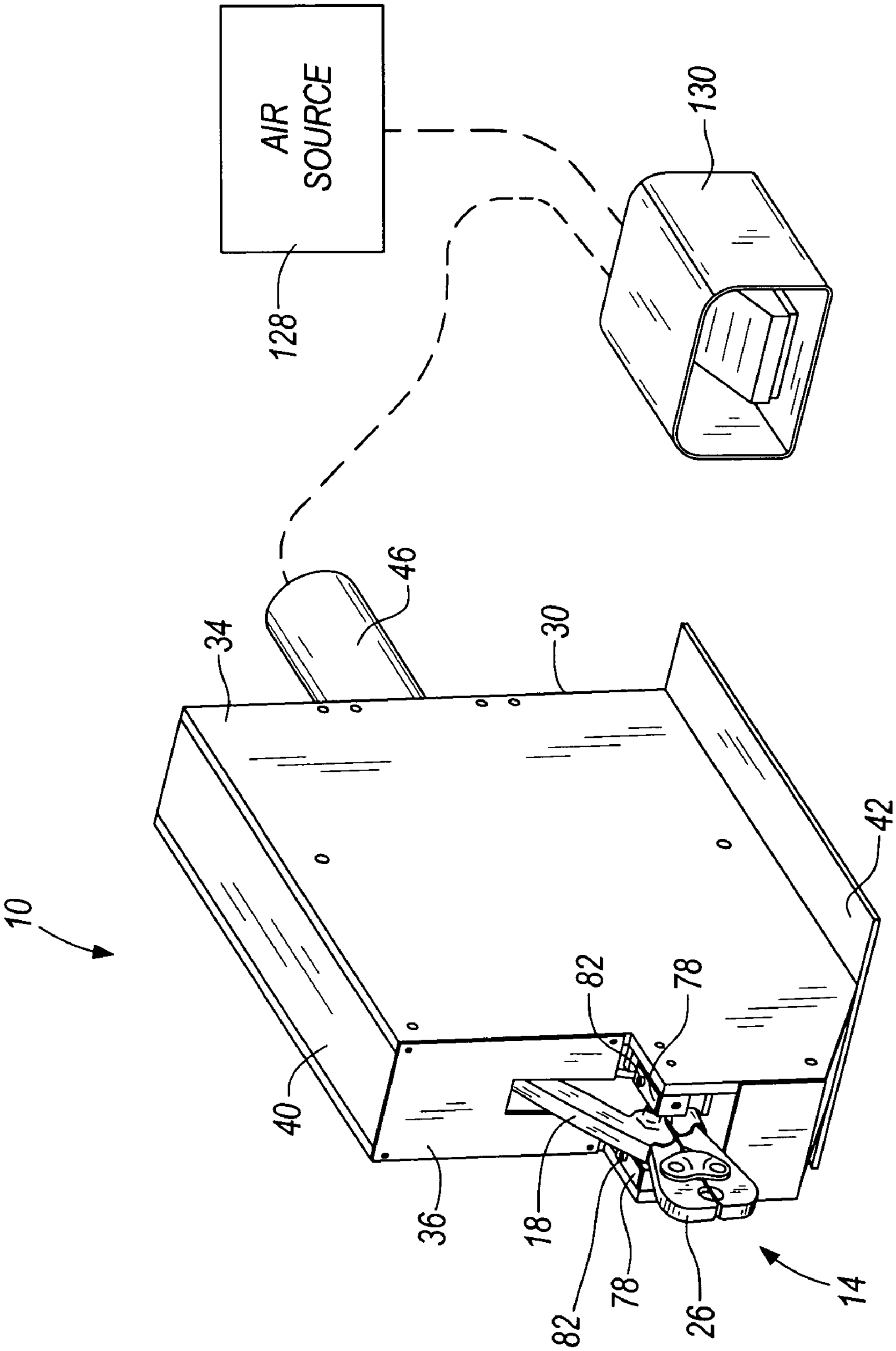
FIG. 1 is a perspective view of a power-operated tool holder according to an exemplary embodiment of the present invention.

Before any features of the invention are explained in detail, it is to be understood that the invention is not limited in its application to the details of construction and the arrangements of supports set forth in the following description and illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

A power-operated tool holder 10 according to an exemplary embodiment of the present invention is shown in FIGS. 1–4. The holder 10 illustrated in FIGS. 1–4 is designed to operate and automate a spring-biased hand tool 14 having dual interconnected handles 18, wherein the spring-biasing mechanism 22 in the hand tool 14 biases the tool handles 18 apart. The hand tool 14 includes a head portion 26, wherein movement of the handles 18 results in some movement or action at the head portion 26 to perform a function on an object or assembly (e.g., clipping, crimping, cutting, bending, trimming, splicing, stripping, and the like). In the illustrated construction by way of example only, a crimping tool 14 is secured within and actuated by the holder 10, whereby movement of the handles 18 results in a crimping action at the head portion 26 of the crimping tool 14. More specifically, squeezing together the handles 18 results in the crimping action at the head portion 26. It will be appreciated by those in the art that any spring-biased hand tool 14 having dual, interconnected handles 18 operates under similar principles and can be used in place of the hand tool illustrated in FIGS. 1–4 to perform the same and/or other functions. As will be described in greater detail below, in other constructions of the present invention, the hand tool 14 is not spring biased.

As shown in FIGS. 1–4, the holder 10 is generally comprised of a frame or housing 30 having spaced, parallel side panels 34, a front panel 36, a rear panel 38, a top panel 40, and a mounting panel 42. In other constructions of the holder 10, an open frame (not shown) can be utilized such that at least some of the interior components of the holder 10 can be accessed from outside of the holder 10. The frame 30 illustrated in FIGS. 1–4 is only one example of a frame that can be employed to at least partially house the moving components of the holder 10 (described in greater detail below) and to provide structure to which the other components of the holder 10 can be mounted. Accordingly, any other frame shape and size capable of performing these functions can be employed as desired, and need not necessarily employ plates configured as described above and illustrated in FIGS. 1–4. Instead, the frame 30 can be defined by any combination of plates, beams, bars, rods, tubes, and other structural members.

With continued reference to the illustrated exemplary embodiment of FIGS. 1–4, a conventional air cylinder 46 is mounted to the rear panel 38 of the frame 30 such that an air cylinder rod 50 extends into the holder 10 between the side panels 34. The mounting panel 42 includes a plurality of holes 54 to allow the holder 10 to be mounted to a support surface for steady operation. In other embodiments, the holder 10 can be mounted to a support surface or other structure in other manners, or can rest upon a support surface. For example, any portion of the holder 10 (e.g., front, rear, bottom, top, and/or side(s)) can be welded, brazed, clamped, pinned, bolted, riveted, screwed, nailed or secured to any vertical, horizontal or other surface desired. It should be noted that the side panels 34, front panel 36, rear panel 38, top panel 40, and mounting panel 42 can be made of any material capable of withstanding the forces generated by operation of the hand tool as will be described in greater detail below. Such materials include without limitation steel, aluminum, iron, and other metals, plastic or composite material, and the like. As indicated above, any other housing shape can be employed for providing a structure to which the air cylinder 46 and pivot arms 86 (described below) can be mounted.

Figure 4:
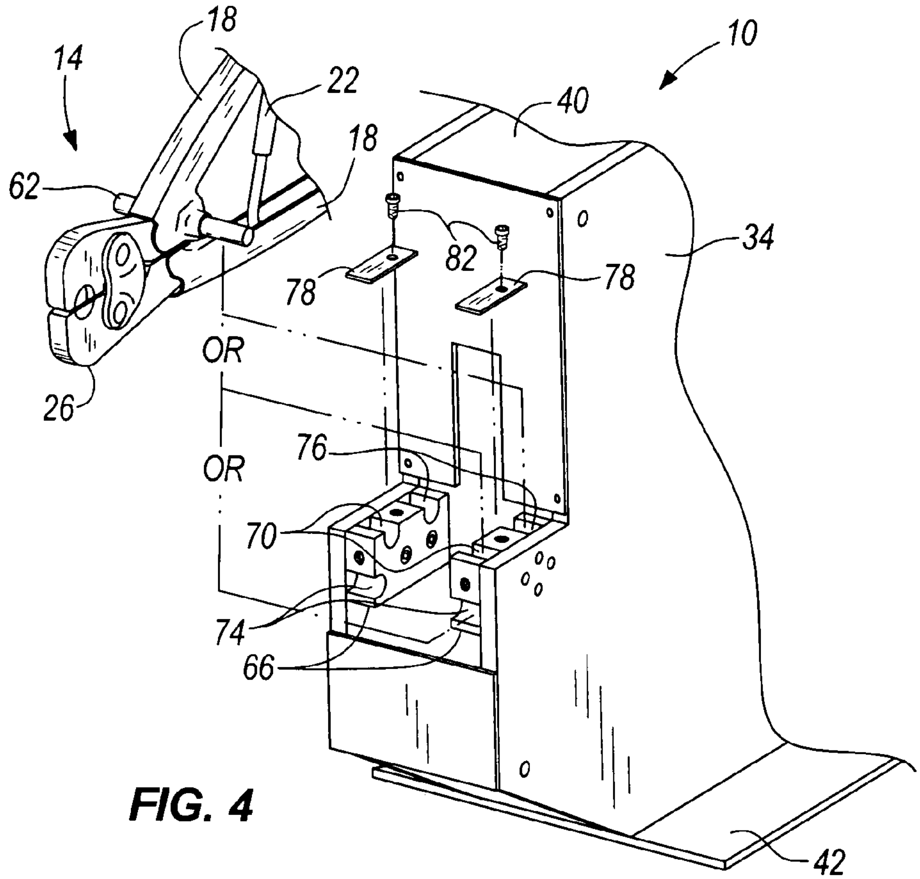
FIG. 4 is an enlarged perspective view of the tool holder of FIG. 1, shown with the hand tool exploded from a tool support.
Figure 5:
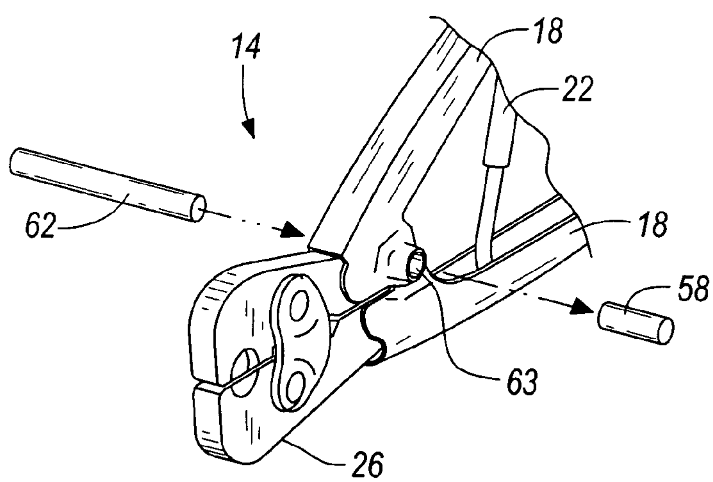
FIG. 5 is an enlarged perspective view of the hand tool shown in FIGS. 1–4, illustrating the original pivot pin of the hand tool being removed and a new extended pivot pin being inserted into an aperture in the hand tool.

As shown in FIG. 4, a hand-operated tool 14 can be removably secured to the holder 10 in a mounted position by a pin and aperture arrangement. An exemplary hand tool 14 that can be mounted in and operated by the tool holder 10 is illustrated in FIG. 5, and utilizes a pin 58 (e.g., a pivot pin of the hand tool or another suitable element) to interconnect the two handles 18. To utilize the hand tool 14 in the tool holder 10, an extended pivot pin 62 is employed to connect the hand tool 14 to the tool holder 10. In some embodiments of the present invention, to prepare the hand tool 14 for operation with the holder 10, the original pin 58 interconnecting the two handles 18 is removed from an aperture 63 in the hand tool 14. The extended pivot pin 62 can then be inserted in place of the original pin 58 in the aperture 63. In other embodiments, the hand tool 14 already has an outwardly-extending pivot pin 62, in which case the pivot pin 62 can be used to mount the hand tool as described herein.

Figure 6:
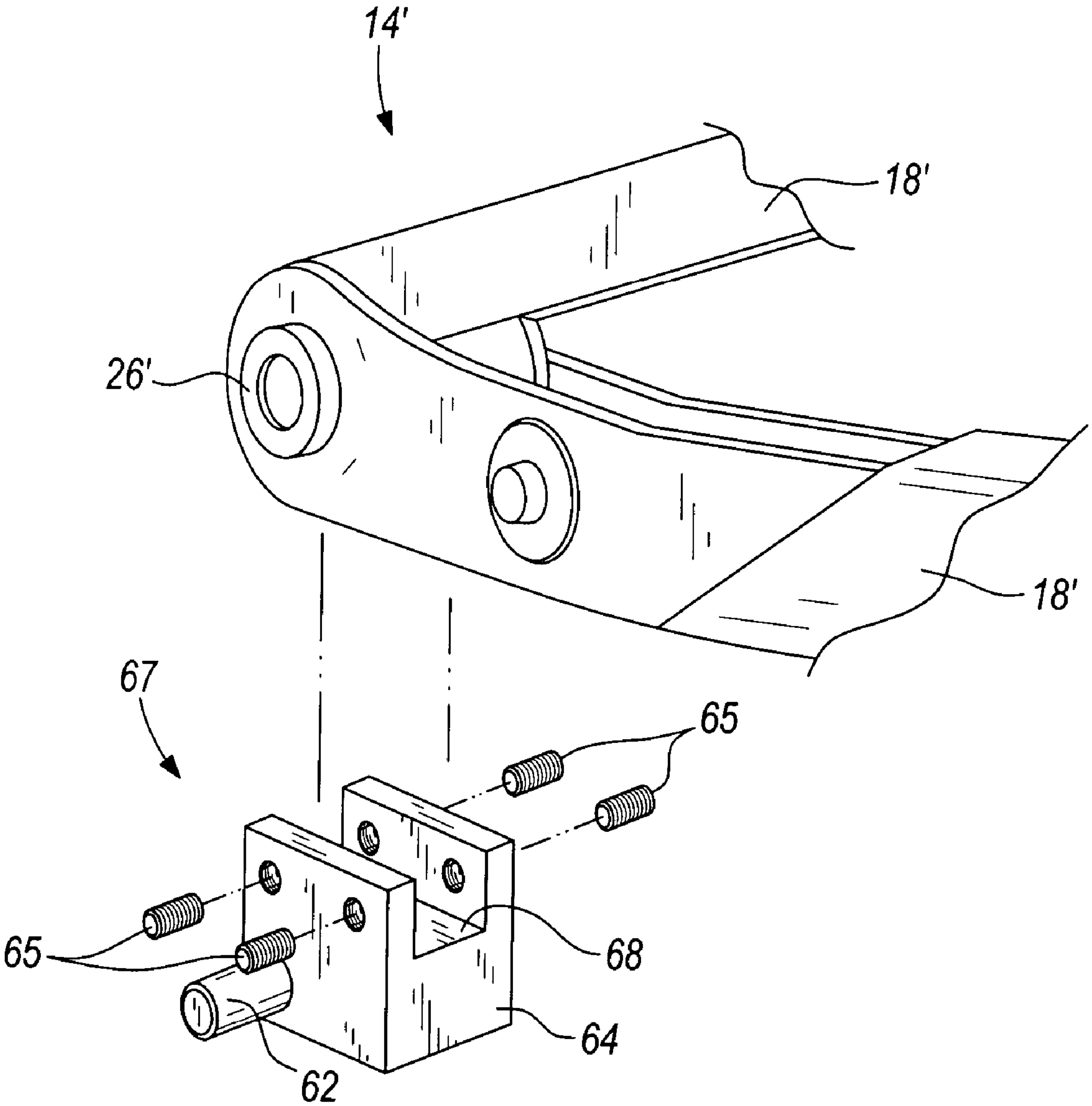
FIG. 6 is an exploded perspective view of another hand tool adapted with a pivot pin.

In some cases, a hand tool may not be easily mounted in the tool holder 10 by a pin received within an aperture in the hand tool as described above. The hand tool 14' illustrated in FIG. 6 is an example of such a hand tool. In such cases, the hand tool can be mounted in the tool holder 10 in other manners. By way of example only, the hand tool 14' illustrated in FIG. 6 can be mounted in the tool holder 10 illustrated in FIGS. 1–4 via an adapter 64 having a pivot pin 62' connected thereto. The adapter 64 can have a body 67 within which is defined a slot 68 to receive a portion of the hand tool 14', and one or more setscrews 65 positioned to clamp the adapter 64 to the portion of the hand tool 14'. It will be appreciated that other adapter shapes and other manners of securing the adapter 64 to the hand tool 14' can be employed, each of which falls within the spirit and scope of the present invention. For example, the adapter 64 can instead or in addition have any other type of aperture therethrough for receiving a leg of the hand tool 14', can take the form of any type of clamp to be secured to a leg or other portion of the hand tool 14', can employ one or more other types of conventional fasteners (e.g., screws, bolts, nails, rivets, or pins) to secure a leg or other portion of the hand tool 14' to the adapter 64, and the like.

Also, in the illustrated construction, the adapter 64 is clamped to the hand tool 14' at a location near a head portion 26' of the hand tool 14'. However, in other constructions, the adapter 64 can take any of a number of different forms and can be configured to engage the hand tool 14' in any of a number of different locations. Further, in the illustrated construction of FIG. 6, the pivot pin 62 can be removable from the adapter 64, or the pin 62 can be permanently connected to the adapter 64 (e.g., by being riveted, pressed, welded, or brazed thereto, or being integrally-formed therewith). It should be noted that either of the exemplary hand tools 14 or 14' described above and illustrated in FIGS. 5 and 6 can be adapted for use with the tool holder 10 of FIGS. 1–4, and that both hand tools 14, 14' are supported and actuated by the tool holder 10 of the present invention in similar manners.

The pivot pin 62 can be mounted to the frame 30 in a number of manners, such as by receiving one end of the pivot pin 62 in a hole, groove, recess, or other aperture in the frame 30, by receiving opposite ends of the pivot pin 62 in respective holes, grooves, recesses, or other apertures in the frame 30, by holding the pivot pin 62 with respect to the frame 30 by one or more clasps, latches, clamps, brackets, and the like, by threading either or both ends of the pivot pin 62 into threaded apertures in the frame 30 (in which case the end(s) of the pivot pin 62 are threaded for this purpose), and the like.

By way of example only, and as shown in FIG. 4, the tool holder 10 of the present invention can have one or more supports 66 connected to any portion of the frame 30 to pivotably receive the pivot pin 62. The supports 66 can take any form desired, and in the illustrated exemplary embodiment of FIGS. 1–4 are plates. Also, the supports 66 can be integral with or part of any portion of the frame 30 (e.g., the side panels 34 of the frame 30), or can be separate elements secured thereto in any manner. For example, the supports 66 in the illustrated embodiment are attached to the side panels 34 of the frame 30 to pivotably receive the pivot pin 62. In the illustrated construction of FIG. 4, the supports 66 are fastened to the side panels 34 using conventional threaded fasteners (e.g., bolts or screws). Alternatively, the supports 66 can be connected to the side panels 34 or other portions of the frame 30 by welding or brazing, by rivets, pins, nails, or other conventional fasteners, by inter-engaging elements on the supports 66 and frame 30, and the like.

The support(s) 66 of the present invention define one or more mounting locations for the pivot pin 62 with respect to the frame 30. In the illustrated embodiment of FIGS. 1–4, the supports 66 provide a plurality of mounting locations defined by a first, second, and third pair of grooves 70, 74, 76 in the supports 66, respectfully, although fewer or more grooves can exist for fewer or more possible hand tool mounting locations. The plurality of mounting locations defined by the pairs of grooves 70, 74, 76 allow the hand tool 14 to be placed in the holder 10 in different mounting configurations with respect to the frame 30. It may be desirable for different hand tools 14 to be configured relative to the housing (and the internal working components of the holder 10) in different manners to achieve proper or sufficient action of each hand tool 14. By way of example only, in the illustrated construction of FIG. 4, the pair of grooves 70 can be used when configuring a lengthy tool with respect to the holder 10, while the pair of grooves 76 can be used when configuring a short tool 14 with respect to the holder 10. In some embodiments, the pivot pin 62 can be received into any one of the first, second, and third pair of grooves 70, 74, 76 by locking tabs 78 secured to the supports 66 via conventional fasteners 82. Alternatively, the pivot pin 62 can be secured to the supports 66 by employing any conventional method and device desired.

In some embodiments of the present invention, the support(s) 66 of the tool holder 10 can be secured in two or more positions and/or orientations with respect to the other portions of the tool holder 10. For example, the supports 66 can be secured to the same location in different rotational positions of the supports 66. In the illustrated exemplary embodiment of FIGS. 1–4, the supports 66 can be secured to the side panels 34 in at least two different rotational positions of the supports 66 with respect to the side panels 34. In particular, in the first rotational position (best shown in FIG. 4) two pairs of grooves 70, 76 are positioned on a top side of the supports 66, while a single pair of grooves 74 are positioned on a front side of the supports 66. In a second rotational position (not shown), the supports 66 are secured to the side panels 34 after being rotated approximately 90 degrees from the positions shown in FIG. 4. In this orientation, the single pair of grooves 74 are positioned on a top side of the supports 66. The ability to secure the supports 66 in different orientations with respect to the tool holder 10 provides additional tool mounting configurations for the tool holder 10 without the need for dedicated supports 66 for different tools.

Another manner in which to provide additional tool mounting configurations for the tool holder 10 is to provide two or more locations at which the supports 66 can be secured on the frame 30. For example, the frame 30 can have multiple apertures or sets of apertures for mounting the supports 66 (and therefore, hand tools 14) in different locations on the frame 30. Multiple support attachment locations can be employed in conjunction with multiple support orientations as described above to provide still more mounting configurations for the tool holder 10.

In some embodiments of the present invention, different supports 66 (e.g., having different shapes and/or different mounting features or elements) are employed to mount different hand tools 14 in the tool holder 10. These different supports 66 can be mounted with respect to the frame 30 using the same or different apertures or other support mounting features.

Figure 2:
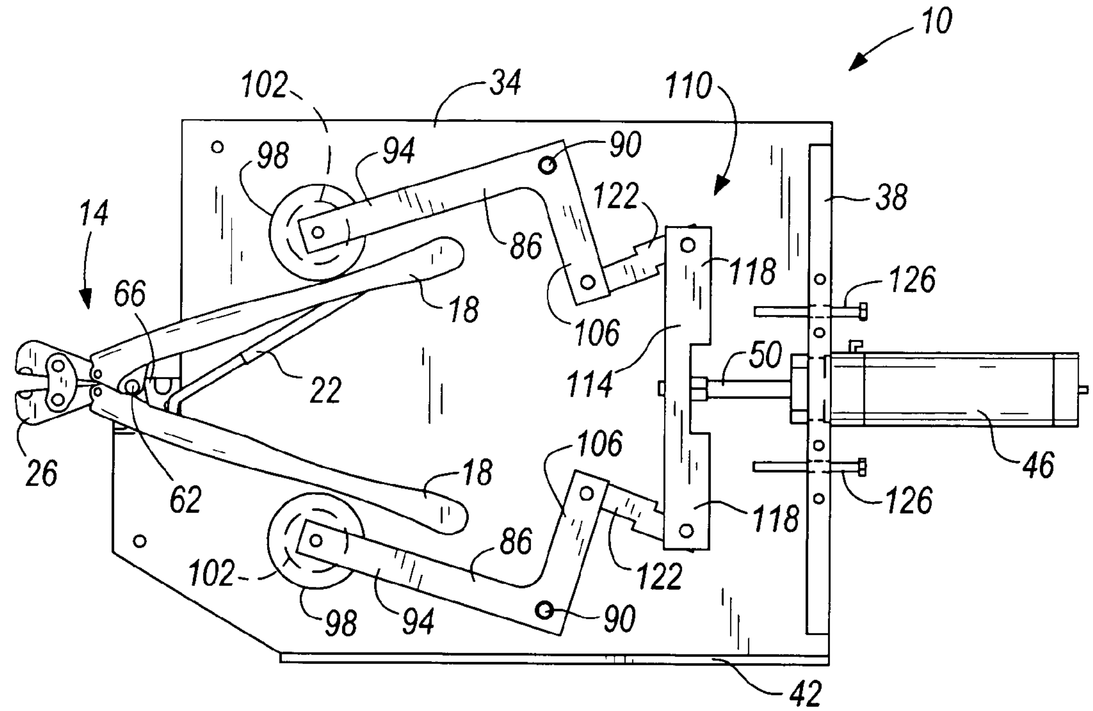
FIG. 2 is a side view of the tool holder of FIG. 1, shown with portions removed to illustrate the internal working components of the tool holder in a first configuration relative to a hand tool.
Figure 3:
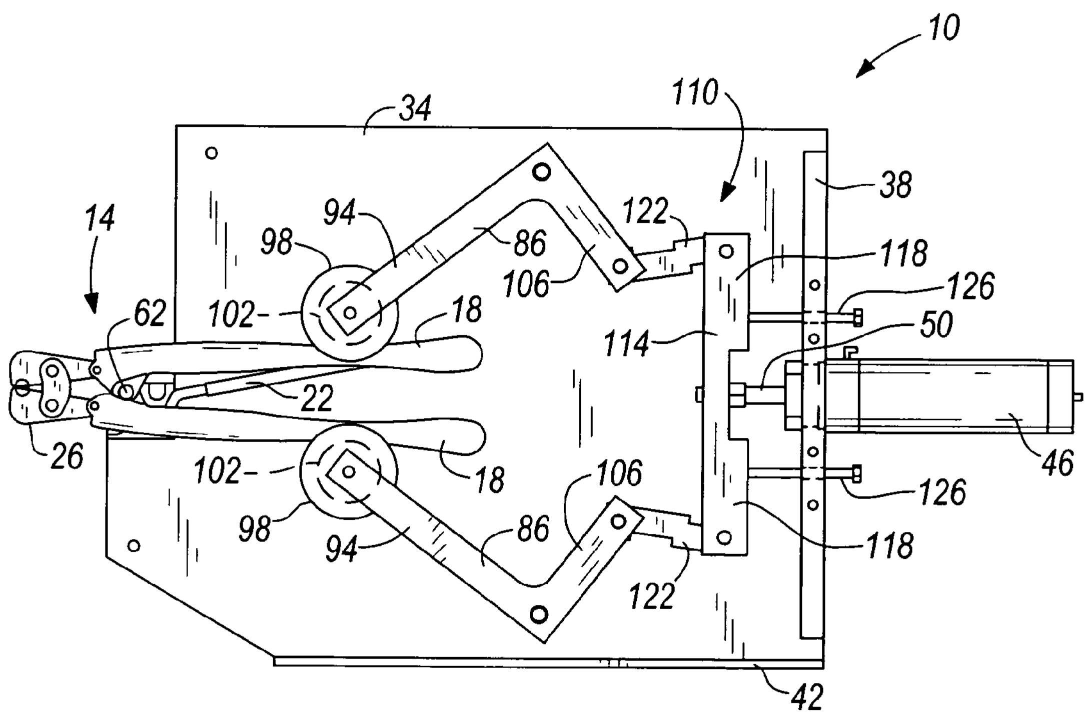
FIG. 3 is another side view of the tool holder of FIG. 1, shown with portions removed to illustrate the internal working components of the tool holder in a second configuration relative to the hand tool.

With continued reference to the illustrated exemplary embodiment of the present invention, FIGS. 2 and 3 illustrate the tool holder 10 with one of the side panels 34 removed to view the internal working components of the tool holder 10. Generally, the working components include a pair of pivot arms 86 each having an "L" shape. However, in other constructions of the tool holder 10, the pivot arms 86 can take any other shape (e.g., substantially straight, U or V-shaped, irregularly-shaped, and the like) capable of transmitting force to the tool handles 18 by rotation of the pivot arms 86.

The pivot arms 86 are pivotably connected to the side panels 34 of the frame 30 using pins 90, pivot posts, lugs, or axles, or in any other suitable manner. Depending at least partially upon the type of frame 30 employed, the pivot arms 86 can be pivotably connected to other locations of the frame 30 as desired, each location positioning the pivot arms 86 with respect to the hand tool 14 in a manner permitting actuation of the hand tool handles by the pivot arms 86 as described in greater detail below.

In some embodiments, rollers 98 are provided to contact and drive the hand tool 14 upon actuation of the pivot arms 86. For example, toward the tool end 94 of each pivot arm 86 in the illustrated exemplary embodiment, a roller 98 is rotatably connected to each pivot arm 86. In some constructions, either or both rollers 98 have an outer circumferential notch 102 for engagement with the hand tool 14. By way of example only, the rollers 98 in FIG. 4 each have a V-shaped notch 102. Alternatively, the rollers 98 can have any other cross-sectional shape at their circumference, including without limitation a flat outer circumference, a U-shaped outer circumference, and the like.

Although the tool holder 10 illustrated in FIGS. 1–4 employs rollers 98 connected to the pivot arms 86 to actuate the hand tool 14, in other embodiments the hand tool 14 is actuated by camming and/or sliding contact with the pivot arms 86 or by camming and/or sliding contact with cams or slides (not shown) connected to the pivot arms 86. The pivot arms 86 or cams can press against the hand tool 14 in actuation of the pivot arms 86 and in some cases can have sliding contact with the hand tool 14 as the pivot arms 86 are rotated.

As shown in FIGS. 2–3, the pivot arms 86 are connected to the air cylinder 46 at a first end 106 of the pivot arms 86 via an adapter assembly 110. An adapter bar 114 of the adapter assembly 110 is connected to the end of the air cylinder rod 50, and has opposing connecting ends 118. The ends 106 of the pivot arms 86 and the ends 118 of the adapter bar 114 can be connected in any manner permitting relative rotation between the pivot arms 86 and the adapter bar 114. In the illustrated construction of FIGS. 2–3 for example, these ends 106, 118 are connected via links 122, wherein the links 122 are pivotably connected to the first and second connecting ends 106, 118 of the adapter bar 114.

As a result of the interconnection of the moving components of the tool holder 10 illustrated in FIGS. 1–4, linear motion of the air cylinder rod 50 results in horizontal and vertical motion of the rollers 98, wherein the motion of each roller 98 traces an arc relative to the side panels 34 of the tool holder 10. More specifically, extension of the air cylinder rod 50 causes the rollers 98 to move apart from one another, while retraction of the air cylinder rod 50 causes the rollers 98 to move toward one another. However, in other constructions of the tool holder 10, movement of the rollers 98 in the tool holder 10 need not necessarily be arc-shaped. Depending at least partially upon the manner in which the pivot arms 86 (or alternative handle-actuating elements)

move and are connected in the tool holder 10, the rollers 98 can move in purely linear paths, in purely arcuate paths, in a combination of linear and arcuate paths, in irregular paths, and the like.

In alternative constructions to that shown in FIGS. 2 and 3, the pivot arms 86 can be directly connected to the adapter bar 114 for actuation by the air cylinder 46. In such cases, the pivot arms 86 can still pivot with respect to the adapter bar 114 via lost-motion pivotable connections between the pivot arms 86 and the adapter bar 114 (e.g., pivot pins of the pivot arms 86 received within elongated apertures in the adapter bar 114, or vice-versa, or other conventional pivotable lost-motion connections). In other alternative constructions, the pivot arms 86 can be directly pivotably connected to the air cylinder rod 50 in any suitable manner (whether by lost-motion connections or otherwise). In still other alternative constructions, the links 122 are directly pivotably connected to the air cylinder rod 50 in any suitable manner (whether by lost-motion connections or otherwise).

One having ordinary skill in the art will appreciate that still other manners of driving the pivot arms 86 via the air cylinder 46 are possible and fall within the spirit and scope of the present invention. Also, in other embodiments, each pivot arm 86 is rotatably driven by dedicated air cylinders 46 or other actuators connected to the pivot arms 86 via one or more linkages or by direct connection to the pivot arms 86.

With reference again to the embodiment shown in FIGS. 1–4, it may be desirable in some embodiments to limit the travel of the moving components of the tool holder 10. For example, in the illustrated embodiment as best shown in FIGS. 2–3, opposing screws 126 are threaded into the rear panel 38 of the frame 30 to provide stops against the adapter bar 114 upon retraction of the air cylinder rod 50. The setscrews 126 can be adjusted within the rear panel 38 such that the rollers 98 are only allowed to move an allotted distance to actuate the tool 14. These stops can also prevent the rollers 98 from over-stressing the tool 14 upon retraction of the air cylinder rod 50.

In other constructions, the stops can be defined by other elements performing the same function to limit the motion of the adapter bar 114, other elements of the adapter assembly 110, and/or the pivot arms 86. For example, threaded fasteners can be received within apertures in any other part of the frame 30 and can be extended into one or more paths of the rollers 98, pivot arms 86, links 122, and adapter bar 114 in order to limit travel of the moving components of the tool holder 10. As another example, one or more blocks, pins, or other elements can be permanently or releasably mounted to the frame 30 in different locations in the path(s) of the rollers 98, pivot arms 86, links 122, and adapter bar 114. In such cases, the frame 30 can be provided with multiple apertures or other mounting features at which to mount such stops (thereby defining an adjustable range of motion of the moving components). Still other manners of stopping one or more of the moving elements of the tool holder 10 are possible and fall within the spirit and scope of the present invention.

The air cylinder 46 employed in the illustrated construction of FIGS. 1–3 is connected to a source of pressurized air 128 for operation. Alternatively, any pressurized gas can be used instead of air. The air cylinder 46 is conventional in design such that it includes the necessary circuit paths to allow the air cylinder rod 50 to extend and retract. Furthermore, the air cylinder 46 can be actuated in any conventional manner, such as by a user-operable button, switch, pedal, or other control, by an electrical controller, and the like. By way of example only, the air cylinder 46 in the illustrated construction of FIGS. 1–3 is connected to a conventional foot-operated switch 130 to control operation of the air cylinder 46. For example, triggering the switch 130 can result in retraction of the air cylinder rod 50 and squeezing of the tool handles 18. Alternatively, triggering the switch 130 can result in extension of the cylinder rod 50 and opening of the tool handles 18.

It will be appreciated that other actuators (other than an air cylinder 46) can be employed to drive the pivot arms 86 as described herein. For example, the air cylinder 46 can be replaced by a hydraulic cylinder (connected to a source of fluid under pressure or a hydraulic pump), a magnetic rail, a motor, and the like. In those cases where the actuator generates rotational driving force, such force can be transmitted to actuate the pivot arms 86 in a number of different manners. For example, an electric motor having a rotating drive shaft can have a worm gear connected to the drive shaft and rotatable to drive one or more gears driving the pivot arms 86 (e.g., meshing with gears on the pivot arms pins 90, meshing with teeth on a peripheral arcuate portion of the pivot arms 86, and the like), can drive two carriages via right-hand and left-hand threaded portions of the work gear (which carriages can drivably engage the handles 18 when the carriages are moved along the worm gear), can drive one or more sprockets connected to the pivot arms 86 via chains, can drive one or more drums or pulleys connected to the pivot arms by belts, can drive a conventional crank-rocker linkage connected to the pivot arms 86, and the like.

In other constructions of the present invention, one or more electromagnetic solenoids can be used in place of the air cylinder 46 to cause movement of the pivot arms 86. Alternatively, one or more electromagnets can be mounted on the frame 30 or on the pivot arms 86 (or other moving components) for attracting and/or repelling one or more other magnets or electro-magnets on the pivot arms 86 (or other moving components) or the frame 30, respectively, to drive the pivot arms 86.

In the alternative embodiments described above, it should be noted that the actuators need not necessarily be mounted in the location of the air cylinder 46 shown in the figures. Instead, the actuator can be mounted on any part of the frame 30 and can be oriented in any direction with respect to the pivot arms 86 in order to facilitate driving connections thereto. Also, one or more mechanical stops such as that employed in the illustrated construction of FIGS. 2–3 or those described above, a conventional torque-limiting circuit, voltage adjustment circuit, or a motion controller connected to and electrically controlling the motion of the actuator can be used to limit travel of the moving components of the tool holder 10, if desired. It should also be noted that the pivot arms 86 in the various embodiments described herein can be driven at any location desired. Although the pivot arms 86 in the illustrated exemplary embodiment are driven at ends 106 of the pivot arms 86 as described above, any of the driving elements or mechanisms described herein can apply force to the pivot arms 86 at a variety of different positions along the pivot arms 86, including at or along the tool end 94 of the pivot arms 86, the connecting ends 106 of the pivot arms 86 or anywhere therebetween.

If desired, a spring-biasing mechanism can be used with any of the handle-actuating assemblies described herein to provide a biasing force against the action of the handle-actuating assemblies. For example, one or more extension, compression, or torsion springs can be directly or indirectly coupled to the pivot arms 86 or pivot arm pins 60 and to the frame 30 to exert a biasing force against motion of the pivot arms 86 toward one another. Such biasing force can also or instead be provided by controlling the actuator to open the pivot arms 86 as desired.

To secure a hand tool 14 within the tool holder 10 illustrated in the exemplary embodiment of FIGS. 1–4, the hand tool 14 is oriented and guided (e.g., by a user) into the tool holder 10 such that the handles 18 of the tool 14 are within the tool holder 10 and the pivot pin 62 is inserted within one of the pairs of grooves 70, 74, or 76 or other pivot pin apertures in the supports 66. As a result, the handles 18 of the hand tool 14 are substantially in the same plane as the circumferential notches 102 (if employed) of the rollers 98 such that the rollers 98 are allowed to roll along the handles 18 via the circumferential notch 102 of each roller 98. In other embodiments, the handles 18 are otherwise positioned to be acted upon by the rollers 98, cams, slides, or other elements coupled to the pivot arms 86 when the pivot arms 86 are rotated. Once the pivot pin 62 is located in one of the pairs of grooves 70, 74, or 76 or other pivot pin apertures provided, the pivot pin 62 can be secured to the supports 66 via the locking tabs 78. To remove a hand tool 14 from the tool holder 10, the reverse of the above procedure is performed. This procedure allows for a quick and relatively easy changeover between tools 14, if so desired.

In operation, the actuator 46 is actuated to drive the adapter bar 114 and links 122 (if employed), thereby rotating the pivot arms 86 about their pins 90. This rotation causes the pivot arms 86 to press against the handles of the hand tool 14 (either directly or via the rollers 98 as shown in the illustrated exemplary embodiment), thereby actuating the hand tool 14. The actuator 46 can then be actuated to drive the adapter bar 114 and links 122 in a reverse direction, thereby rotating the pivot arms 86 about their pins 90 in an opposite direction. This rotation causes the pivot arms 86 to exert less force upon the handles of the hand tool 14, thereby de-actuating the hand tool 14.

Since the hand tool 14 illustrated in FIGS. 1–5 is secured to the tool holder 10 via the pivot pin 62, little to no movement of a workpiece results when the workpiece is placed between the jaws of the head portion 26 of the hand tool 14. This same operational feature exists for many other hand tools that can be mounted within the tool holder 10 of the present invention. Also, the pivot arms 86 and rollers 98, cams, slides, or other handle-engaging elements (if employed) can self-align and self-adjust to the contours of the handles 18 upon engaging and rolling along the handles 18 of the hand tool 14. Accordingly, a higher degree of workpiece and tool control is possible based upon the pivotal movement of the tool 14 about the pivot pin 62. This stands in contrast to other powered tool holders that are typically arranged to clamp one tool handle while actuating another, thereby generating significant undesirable tool head movement during operation.

The constructions described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

For example, in some embodiments of the present invention, the pivot arms 86 can be connected to the handles 18 of the hand tool 14 in order to both open and close the handles 18. By way of example only, either or both pivot arms 86 can have two or more rollers, cams, fingers, or other elements between which a handle 18 of the hand tool 14 is received, thereby enabling the holder 10 of the present invention to open and close the hand tool 14. Accordingly, in such constructions, the hand tool 14 inserted in the holder 10 need not necessarily be spring-biased.

As another example, in some alternative constructions of the present invention, either or both pivot arms 86 can be connected to low-friction contoured pads employed to squeeze the handles 18 (used as an alternative to rollers 98 riding upon the handles 18). Upon contacting the handles 18, the pad(s) utilize their contours to follow the shape defined by the handles 18 in order to squeeze the handles 18.

Although the tool 14 illustrated in the figures is secured to the frame 30 by a pin 62 received in the supports 66, it should be noted that the tool 14 can be mounted in the frame 30 in a number of other manners falling within the spirit and scope of the present invention. By way of example only, a pin 62 can extend through apertures in the walls or other elements of the frame 30 for pivotably securing the tool 14 thereto. Although not required to practice the present invention, a number of advantages are achieved by directly or indirectly connecting the hand tool 14 to the frame 30 via a pivot pin 62 about which the tool 14 pivots during normal operation.

I claim:

1. A power-operated tool holder adapted to mount a hand tool via a pivot pin, the tool holder comprising:

a frame having a support adapted to receive the pivot pin, the support having at least two mounting locations at which the pivot pin can be received, each mounting location defining a different mounting position of the hand tool with respect to the frame; and an actuator coupled to the frame and releasably coupled to the hand tool in a mounted position of the hand tool with respect to the frame, the actuator movable to actuate at least part of the hand tool about the pivot pin in the mounted position of the hand tool.

2. The tool holder of claim 1, wherein the pivot pin is a part of the hand tool.

3. The tool holder of claim 1, wherein the pivot pin is removably insertable into an aperture in the hand tool.

4. The tool holder of claim 1, wherein the pivot pin couples portions of the hand tool together.

5. The tool holder of claim 1, wherein the support includes at least two apertures positioned to receive the pin in the mounting locations.

6. The tool holder of claim 1, wherein the support includes an aperture dimensioned to receive the pivot pin.

7. The tool holder of claim 1, further comprising a roller positioned to drivably engage a handle of the hand tool in the mounted position of the hand tool, the roller movable responsive to actuation of the actuator.

8. The tool holder of claim 1, further comprising an arm coupled to the frame and movable responsive to actuation of the actuator to drive a handle of the hand tool.

9. A power-operated tool holder adapted to actuate a hand tool having a first handle and a second handle, the tool holder comprising:

a frame adapted to support the hand tool in a mounted position of the hand tool in the frame;

a first roller positioned to drivably engage the first handle of the hand tool when installed in the mounted position in the frame;

a second roller positioned to drivably engage the second handle of the hand tool when installed in the mounted position in the frame; and an actuator coupled to the frame and to the first and second rollers, the first and second rollers actuatable by the actuator to drive the first and second handles of the hand tool, respectively.

10. The tool holder of claim 9, further comprising a support coupled to the frame to receive the hand tool in the mounted position.

11. The tool holder of claim 10, further comprising a pivot pin removably coupled to the hand tool and received by the support.

12. The tool holder of claim 9, further comprising:

a first arm coupling the actuator and the first roller; and a second arm coupling the actuator and the second roller.

13. The tool holder of claim 12, wherein the first and second arms are pivotable with respect to the frame to cause the first and second rollers to drive the first and second handles, respectively.

14. The tool holder of claim 9, wherein the first and second rollers substantially simultaneously drive the first and second handles, respectively, upon actuation of the actuator.

15. The tool holder of claim 9, wherein the first and second rollers roll along the first and second handles, respectively, to drive the handles.

16. A power-operated tool holder adapted to actuate a hand tool having a first handle and a second handle, the tool holder comprising:

a frame to which the hand tool is removably mounted;

an actuator coupled to the frame;

a first arm drivably coupled to the actuator, the first arm movable by the actuator to actuate the first handle of the hand tool;

a second arm drivably coupled to the actuator, the second arm movable by the actuator to actuate the second handle of the hand tool, the first and second arms movable with respect to the hand tool to actuate the hand tool;

a first roller coupled to the first arm, the first roller drivably engageable with the first handle; and a second roller coupled to the second arm, the second roller drivably engageable with the second handle.

17. The tool holder of claim 16, further comprising a support coupled to the frame to removably mount the hand tool.

18. The tool holder of claim 17, further comprising a pivot pin removably coupled to the hand tool and received by the support.

19. The tool holder of claim 16, wherein the first and second arms are pivotable with respect to the frame to actuate the first and second handles, respectively.

20. The tool holder of claim 16, further comprising a link coupled to the first and second arms and movable by the actuator to substantially simultaneously actuate the first and second arms.

21. A power-operated tool holder adapted to actuate a hand tool, the power-operated tool holder comprising:

a frame having a tool support by which the hand tool is releasably mounted to the frame, the tool support having a first mounting location and a second mounting location different than the first mounting location to which a common portion of the hand tool is releasably mounted in different mounting configurations of the hand tool, the hand tool mounted in different positions with respect to the frame in the different mounting configurations; and an actuator coupled to the frame, the hand tool driven responsive to actuation of the actuator.

22. The tool holder of claim 21, wherein the common portion of the hand tool includes a pivot pin releasably coupled to the hand tool and received by the support.

23. The tool holder of claim 22, further comprising:

a first aperture in the tool support at least partially defining the first mounting location, the pivot pin removably receivable in the first aperture to mount the hand tool in a first mounting configuration with respect to the frame; and a second aperture in the tool support at least partially defining the second mounting location, the pivot pin removably receivable in the second aperture to mount the hand tool in a second mounting configuration with respect to the frame.

* * * * *